(12) United States Patent
Luedtke

(10) Patent No.: US 12,024,433 B2
(45) Date of Patent: Jul. 2, 2024

(54) METHODS FOR MAKING GRAPHENE OXIDE GELS

(71) Applicant: SIGMA-ALDRICH CO. LLC, St. Louis, MO (US)

(72) Inventor: Avery Luedtke, Milwaukee, WI (US)

(73) Assignee: Sigma-Aldrich Co. LLC, St. Louis, MO (US)

( * ) Notice: Subject to any disclaimer, the term of this patent is extended or adjusted under 35 U.S.C. 154(b) by 733 days.

(21) Appl. No.: 16/611,131

(22) PCT Filed: May 4, 2018

(86) PCT No.: PCT/US2018/031162
§ 371 (c)(1),
(2) Date: Nov. 5, 2019

(87) PCT Pub. No.: WO2018/204831
PCT Pub. Date: Nov. 8, 2018

(65) Prior Publication Data
US 2020/0189915 A1 Jun. 18, 2020

Related U.S. Application Data

(60) Provisional application No. 62/502,320, filed on May 5, 2017.

(51) Int. Cl.
*C01B 32/198* (2017.01)
*B01J 13/00* (2006.01)
(Continued)

(52) U.S. Cl.
CPC ......... *C01B 32/198* (2017.08); *B01J 13/0056* (2013.01); *B01J 13/0091* (2013.01);
(Continued)

(58) Field of Classification Search
CPC ... C01B 32/182; C01B 32/184; C01B 32/198; C01B 32/192; B01J 13/0056;
(Continued)

(56) References Cited

U.S. PATENT DOCUMENTS

2013/0015409 A1 1/2013 Fugetsu
2014/0154770 A1 6/2014 Vittadello et al.
(Continued)

FOREIGN PATENT DOCUMENTS

CN 102989416 B 8/2013
CN 103496695 A 1/2014
(Continued)

OTHER PUBLICATIONS

Liu, Jingjing, et al. "Facile fabrication of carboxymethyl cellulose sodium/graphene oxide hydrogel microparticles for water purification." RSC advances 6.55 (2016): 50061-50069.*
(Continued)

*Primary Examiner* — Richard M Rump
(74) *Attorney, Agent, or Firm* — Sigma-Aldrich Co. LLC

(57) ABSTRACT

Methods for reversibly forming graphene oxide gels by reacting graphene oxide dispersed in an aqueous solution with organic amines or quaternary phosphonium salts. Also provided are methods of forming anhydrous graphene oxide dispersions.

16 Claims, 3 Drawing Sheets

Graphite flakes

1) KMnO₄, H₂SO₄
2) H₂O₍ₛ₎, 0 °C
3) H₂O₂, 0 °C
4) centrifugation
5) dialysis purification Graphene oxide 2 mg/mL, dispersion in H₂O Graphene oxide 2 mg/mL, dispersion in H₂O 1) tris(2-aminoethyl)amine, H₂O, H₂SO₄
2) centrifugation
3) removal of excess acid and amine by centrifuge

(51) Int. Cl.
*C01B 32/192* (2017.01)
*H01G 11/32* (2013.01)
*H01M 4/133* (2010.01)

(52) U.S. Cl.
CPC ........... *C01B 32/192* (2017.08); *H01G 11/32* (2013.01); *H01M 4/133* (2013.01)

(58) Field of Classification Search
CPC ..... B01J 13/0091; H01G 11/32; H01M 4/133; Y02E 60/10
See application file for complete search history.

(56) References Cited

U.S. PATENT DOCUMENTS

| | | | |
|---|---|---|---|
| 2015/0183189 A1 | | 7/2015 | Kim et al. |
| 2015/0361089 A1 | | 12/2015 | Lee |
| 2018/0193261 A1* | | 7/2018 | Lee ........................ B01J 20/261 |

FOREIGN PATENT DOCUMENTS

| | | | | |
|---|---|---|---|---|
| CN | 103804828 | A | * | 5/2014 |
| CN | 104760950 | A | | 7/2015 |
| CN | 105536774 | A | * | 5/2016 |
| CN | 105645403 | A | | 6/2016 |
| JP | 2009-242209 | A | | 10/2009 |
| JP | 2009242209 | A | * | 10/2009 |
| JP | 2013-056818 | A | | 3/2013 |
| JP | 2013-530908 | A | | 8/2013 |
| JP | 2015-526364 | A | | 9/2015 |
| WO | 2011/131722 | A1 | | 10/2011 |
| WO | 2013/132388 | A1 | | 9/2013 |
| WO | 2015/187971 | A1 | | 12/2015 |
| WO | 2018/204831 | A1 | | 11/2018 |

OTHER PUBLICATIONS

Xiong, Zhiyuan, et al. "Ultratough cellular films from graphene oxide hydrogel: A way to exploit rigidity and flexibility of two-dimensional honeycomb carbon." Carbon 107 (2016): 548-556.*
Fan, Jinchen, et al. "Mechanically strong graphene oxide/sodium alginate/polyacrylamide nanocomposite hydrogel with improved dye adsorption capacity." Journal of Materials Chemistry A 1.25 (2013): 7433-7443.*
Chung, Jin Suk, Eui Jung Kim, and Seung Hyun Hur. "The molecular level control of three-dimensional graphene oxide hydrogel structure by using various diamines." Chemical Engineering Journal 246 (2014): 64-70.*
Jang et al., "Effects of the Alkylamine Functionalization of Graphene Oxide on the Properties of Polystyrene Nanocomposites", Nanoscale Research Letters, 2014, 6 pages.
Compton et al., "Electrically Conductive "Alkylated" Graphene Paper via Chemical Reduction of Amine-Functionalized Graphene Oxide Paper", Advanced Materials, 2010, pp. 892-896.
Compton et al., "Electrically Conductive "Alkylated" Graphene Paper via Chemical Reduction of Amine-Functionalized Graphene Oxide Paper", Electronic Supporting Information for Advanced Materials, Published on Feb. 18, 2010, pp. S1-S10.
Cao et al., "Alkyl-functionalized Graphene Nanosheets with Improved Lipophilicity", Carbon 48 (2010), pp. 1683-1685.
Bai et al., "A pH-sensitive Graphene Oxide Composite Hydrogel", Chemical Communication, vol. 46, Published on Mar. 5, 2010, pp. 2376-2378.
Mei et al., "Highly Efficient Photoluminescent Graphene Oxide with Tunable Surface Properties", Chemical Communication, vol. 46, 2010, pp. 7319-7321.
Mei et al., "Highly Efficient Photoluminescent Graphene Oxide with Tunable Surface Properties", Electronic Supplementary Information for Chemical Communications, 2010, pp. 1-6.
Hu et al., "Understanding Hydrothermally Reduced Graphene Oxide Hydrogels: From Reaction Products to Hydrogel Properties", Chemistry of Materials, vol. 28, 2016, pp. 1756-1768.
Tran-Thanh et al., "A Few-Layer Graphene-Graphene Oxide Composite Containing Nanodiamonds as Metal-Free Catalysts", Journal of Materials Chemistry A, 2014, 9 pages.
Tran-Thanh et al., "Few-Layer Graphene-Graphene Oxide Composite Containing Nanodiamonds as Metal-Free Catalyst", Electronic Supplementary Information (ESI) for Journal of Materials Chemistry, 2014, 7 pages.
Georgakilas et al., "Noncovalent Functionalization of Graphene and Graphene Oxide for Energy Materials, Biosensing, Catalytic, and Biomedical Applications", American Chemical Society, Chemical Reviews, Mar. 2016, 56 pages.
Zhang et al., "Cellular Graphene Aerogel Combines Ultralow Weight and High Mechanical Strength: A Highly Efficient Reactor for Catalytic Hydrogenation", Scientific Reports, Published on May 12, 2016, pp. 1-10.
Jang et al., "Effects of the Alkylamine Functionalization of Graphene Oxide on the Properties of Polystyrene Nanocomposites", Nanoscale Research Letters, vol. 9, 2014, 6 pages.
Liu et al., "Supramolecular Hybrid Hydrogels from Noncovalently Functionalized Graphene with Block Copolymers", Macromolecules, vol. 44, ACS Publications, Published on Sep. 14, 2011, pp. 7682-7691.
Paredes et al., "Graphene Oxide Dispersions in Organic Solvents", Langmuir, vol. 24, No. 19, 2008, pp. 10560-10564.
Alberto et al., "Enhanced Organophilic Separations with Mixed Matrix Membranes of Polymers of Intrinsic Microporosity and Graphene-like Fillers", Journal of Membrane Science, 2017, pp. 437-449.
Liang et al., "Dispersion of Graphene Sheets in Organic Solvent Supported by Ionic Interactions", Advanced Materials, 2009, pp. 1679-1683.
Liang et al., "Dispersion of Graphene Sheets in Organic Solvent Supported by Ionic Interactions", Supporting Information, May 2009, 5 pages.
Bai et al., "On the Gelation of Graphene Oxide", The Journal of Physical Chemistry, Published on Mar. 14, 2011, pp. 5545-5551.
Bai et al., "On the Gelation of Graphene Oxide", Supporting Information, 2011, 6 pages.
Hou et al., "Positive Piezoresistive Behavior of Electrically Conductive Alkyl-functionalized Graphene/Polydimethylsilicone Nanocomposites", Journal of Materials Chemistry C, vol. 1, 2013, pp. 515-521.
Yang et al., "Graphene Aerogel Prepared by Thermal Evaporation of Graphene Oxide Suspension Containing Sodium Bicarbonate", Journal of Materials Chemistry A, vol. 3, 2015, pp. 7950-7958.
Chen et al., "A One-step Method for Reduction and Self-assembling of Graphene Oxide into Reduced Graphene Oxide Aerogels", Journal of Materials Chemistry A, 2013, pp. 2869-2877.
Chen et al., "A One-step Method for Reduction and Self-assembling of Graphene Oxide into Reduced Graphene Oxide Aerogels", Supplementary Information, 2012, 3 pages.
Choudhary et al., "Dispersion of Alkylated Graphene in Organic Solvents and its Potential for Lubrication Applications", Journal of Materials Chemistry, vol. 22, Aug. 17, 2012, pp. 21032-21039.
Niyogi et al., "Solution Properties of Graphite and Graphene", Journal of American Chemical Society, vol. 128, No. 24, 2006, pp. 7720-7721.
Georgakilas et al., "Functionalization of Graphene: Covalent and Non-Covalent Approaches, Derivatives and Applications", Chemical Reviews, 2012, pp. 6156-6214.
International Search Report and Written Opinion received for PCT Patent Application No. PCT/US2018/031162, mailed on Sep. 11, 2018, 18 pages.
International Preliminary Report on Patentability received for PCT Patent Application No. PCT/US2018/031162, mailed on Nov. 14, 2019, 14 pages.
Adhikari et al., "Graphene Oxide-Based Hydrogels to Make Metal Nanoparticle-Containing Reduced Graphene Oxide-Based Functional Hybrid Hydrogels", ACS Applied Materials & Interfaces, vol. 4, No. 10, Oct. 1, 2012, pp. 5472-5482.

(56) References Cited

OTHER PUBLICATIONS

Jiao et al., "Self-Assembly Reduced Graphene Oxide Nanosheet Hydrogel Fabrication by Anchorage of Chitosan/Silver and Its Potential Efficient Application toward Dye Degradation for Wastewater Treatments", ACS Sustainable Chemistry & Engineering, vol. 3, No. 12, Oct. 29, 2015, pp. 3130-3139.

Du et al., "Polyaniline-Modified Oriented Graphene Hydrogel Film as the Free-Standing Electrode for Flexible Solid-State Supercapacitors", ACS Applied Materials & Interfaces, vol. 7, No. 43, Nov. 4, 2015, pp. 23932-23940.

Office Action received for Japanese Patent Application No. 2019-560307 mailed on Jul. 5, 2022, 5 Pages (2 Pages of English Translation and 3 Pages of Official Copy).

Communication pursuant to Article 94(3) EPC received for European Patent Application No. 18726669.7 mailing date Feb. 22, 2024, 6 Pages.

Office Action received for Chinese Patent Application No. 202210935723.5 mailing date Dec. 1, 2023, 20 Pages (12 Pages of English translation & 8 Pages of Official copy).

\* cited by examiner

METHODS FOR MAKING GRAPHENE OXIDE GELS

CROSS-REFERENCE TO RELATED APPLICATIONS

This application is a U.S. National Stage Application of PCT/US2018/031162, filed May 4, 2018, which claims the benefit of priority to U.S. Provisional Patent Application No. 62/502,320 filed May 5, 2017, the entirety of which is incorporated herein by reference.

BACKGROUND

Graphene is a two-dimensional (2D) material that can be viewed as a single monomolecular sheet of graphite. Since graphene was initially isolated and characterized, graphene has emerged as a material with surprising uniqueness and versatility. Potential applications for graphene are as varied as polymer composites, drug delivery, and energy storage to name a few.

Graphene oxide hydrogels are important for bulk processing, purification, shipping, and storage. These are concentrated, greater than 10 g/L, aqueous gels. Previous methods for forming graphene oxide hydrogels have required the addition of hydrochloric acid at concentrations of 1 M or greater and resulted in graphene oxide hydrogels with too many adventitious impurities. The resulting pH makes the graphene oxide gels unsuitable for applications that require controlled pH or non-corrosive conditions.

Another problem that has heretofore hindered the development of graphene in many applications is aggregation. The formation of aggregates of aggregates blocks the surface area of the graphene, thus reducing the performance of the materials.

Graphene functionalization has been a popular area of research in recent years. Georgakilas et al. "Functionalization of Graphene: Covalent and Non-Covalent Approaches, Derivatives and Applications" (Chem. Rev. 2012, 112, 6156) is a 59 page review article with over 450 citations discussing specifically non-covalent interactions of graphene and graphene oxide and applications for such materials. However, in spite of the number of citations, it was noted many challenges remain, including limited yields, poor quality of materials, limited ability to tailor electronic properties, and energy conversion challenges in, for example, battery and other related applications.

Despite all of the work being done in this field, it is clear that a need still exists for improved graphene and graphene oxide materials that are suitable for a variety of applications. In particular it would be quite advantageous to have a graphene oxide functionalization platform that could be used to generate graphene oxide gels and related materials with tunable properties suitable for a range of uses.

It would additionally be advantageous to have new methods of making graphene oxide gels that have fewer impurities. It would be further advantageous to form graphene oxide gels in milder, less corrosive or non-corrosive conditions to open up new uses that could not be achieved previously because of the corrosive conditions in which the graphene oxide gels existed.

It would further be advantageous if the graphene oxide gels could be formed reversibly, thus providing the ability to form graphene oxide dispersions in anhydrous conditions, thus opening new avenues for reactions that require anhydrous conditions including surface modifications using methods that cannot be done in aqueous conditions and preparation of nanocomposite materials with hydrophobic polymers and nanoparticles.

It would be further advantageous to be able to change the polarity of graphene oxide, thus allowing for both hydrophobic and hydrophilic forms of graphene oxide.

SUMMARY

Provided herein are methods of forming a graphene oxide hydrogel comprising the steps of providing an acidic, aqueous dispersion of graphene oxide, adding a reactant selected from the group consisting of organic amines, and phophonium salts, and stirring the mixture to form the graphene oxide hydrogel.

In various embodiments, the reactant is an organic amine. The organic amine can be a primary, secondary, tertiary, or quaternary amine, or and combinations thereof. The organic amines may be, for example, alkyl amines, arylamines, heterocyclic amines, polymeric amines, spiro tetramines, and combinations thereof. In other embodiments, the reactant can be a phosphonium ion or phosphonium salt. In specific embodiments, the reactant is selected from the group consisting of triethylamine, diisopropylethylamine, tetrabutylammonium hydroxide, 6-aminohexanoic acid, HEPES, N,N-dimethyldodecylamine, diisopropylamine, hexylamine, hexadecylamine, 4,4'-dipyridyl, tris(2-aminoethyl)amine, benzyltriphenylphosphonium chloride, methyltrioctylammonium chloride, dodecyltrimethylammonium chloride, 1,12-diaminododecane, tetrakis(4-aminophenyl)methane and combinations thereof.

The method can further include a step of isolating the resulting graphene oxide gel, which can be achieved by filtering or by centrifugation.

In certain embodiments of the method described herein, the ratio of the reactant to graphene oxide is from about 0.9 mmol reactant per gram graphene oxide to about 400 mmol reactant per gram graphene oxide. In certain embodiments, the aqueous dispersion of graphene oxide has a graphene oxide concentration in the range from about 0.1 g/L to about 5 g/L and the reactant has a total amine concentration or total phosphonium concentration in the range from about 0.05 mM to about 100 mM. In further embodiments, the total amine concentration or total phosphonium concentration is in the range from about 10 mM to about 70 mM. In still further embodiments, the total amine concentration or total phosphonium concentration is about 40 mM.

The aqueous solution is acidified using an inorganic acid, which is added such that the concentration is in the range from about 0.004 M to about 2 M, and a pH of less than 7, and preferably in the range from 6.5 to 1, and more preferably in the range from 6 to 1.5. In a preferred embodiment, the acidic, aqueous dispersion of graphene oxide includes sulfuric acid. In preferred embodiments, the sulfuric acid has a concentration in the range from about 0.004 M to about 2 M. In another embodiment the acidic, aqueous dispersion of graphene oxide includes hydrochloric acid. In those embodiments, the hydrochloric acid has a concentration in the range from about 0.004 M to about 2 M.

In some embodiments, the graphene oxide gel may be lyophilized to yield a graphene oxide aerogel. The graphene oxide aerogel may be reduced to form a graphene aerogel. In some embodiments, such a reduction may be done by thermal reduction or by chemical reduction.

In another embodiment provided herein, a method for forming graphene oxide gels includes the steps of combining an aqueous dispersion of graphene oxide having a pH of less than 7; with a compound of Formula (I): $XR_aR^1R^2R^3$ (I), wherein X is selected from the group consisting of N and P; wherein a is 0 or 1; wherein R, $R^1$, $R^2$ and $R^3$ can be the same or different and are selected from the group consisting of H, alkyl, cycloalkyl, cycloheteroalkyl, aryl, heteroaryl, or wherein two of R, $R^1$, $R^2$ and $R^3$ can form a five- or six-membered ring, wherein the five- or six-membered ring may be saturated or unsaturated and may contain one or more heteroatoms; provided, however, that when X is N and a is 0, no more than 2 of $R^1$, $R^2$ and $R^3$ are H; when X is N and a is 1, no more than 3 of R, $R^1$, $R^2$ and $R^3$ are H, and when X is P, a is 1, none of R, $R^1$, $R^2$ and $R^3$ are H; and allowing the graphene oxide to react with the compound of formula I, to form a graphene oxide gel; and optionally, isolating the graphene oxide gel.

In some embodiments of this method, there is a further step of lyophilizing the graphene oxide gel to form a graphene oxide aerogel. In still other embodiments, the method further includes a step of reducing the graphene oxide aerogel to form a graphene aerogel.

Further provided is a method of forming an anhydrous graphene oxide dispersion in an organic solvent including the steps of providing an isolated graphene gel, removing the water from the isolated graphene gel; and dispersing the isolated graphene gel in the organic solvent to form a graphene oxide dispersion in the organic solvent. In preferred embodiments, the organic solvent is an anhydrous organic solvent. In some embodiments of this method, the dispersing step is done by sonicating the isolated graphene gel in the organic solvent.

Applications using the graphene oxide gels and aerogels are also provided.

DETAILED DESCRIPTION

Figure 1:
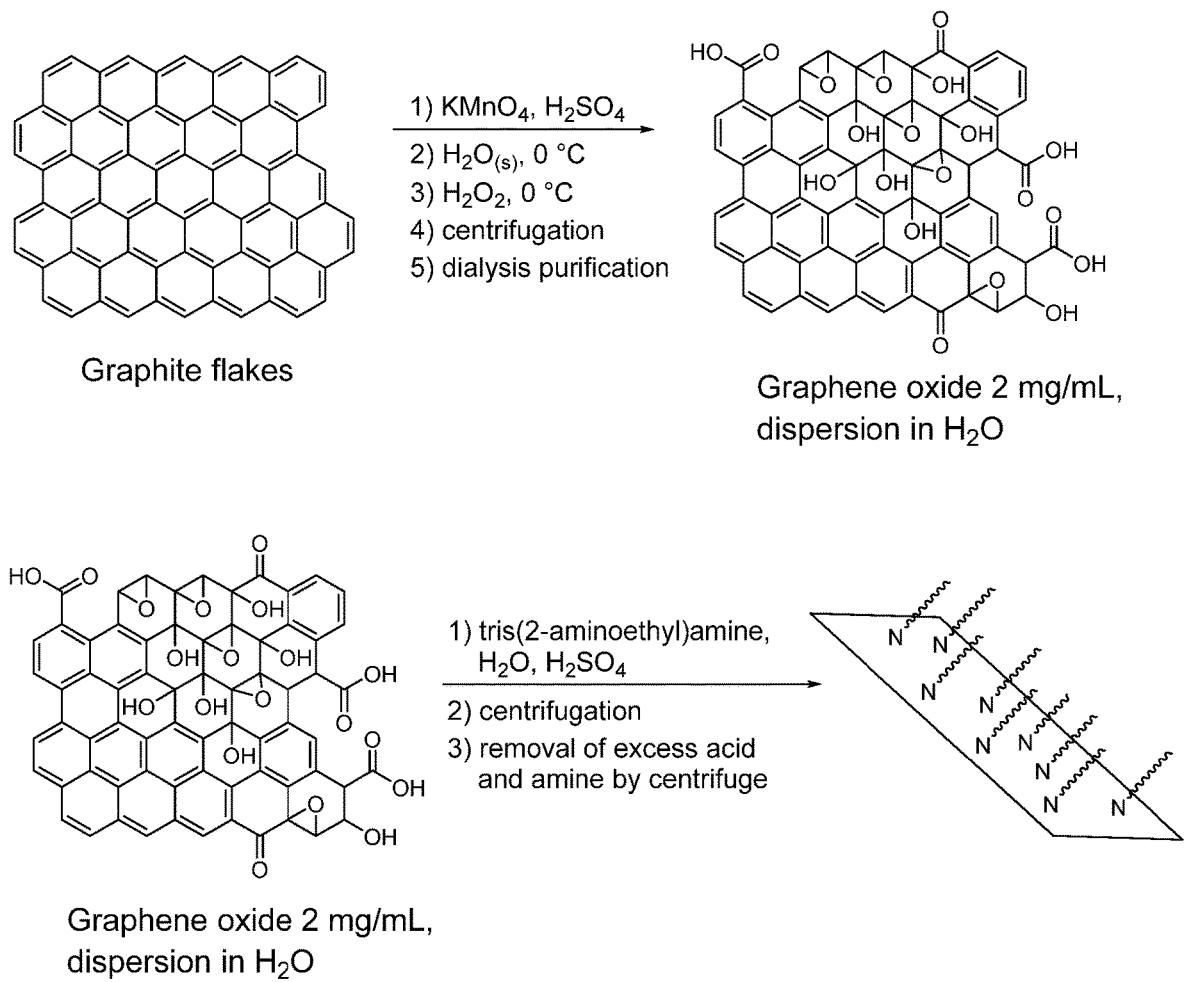
FIG. 1 illustrates a method of making a graphene oxide hydrogel as described herein.
Figure 2:
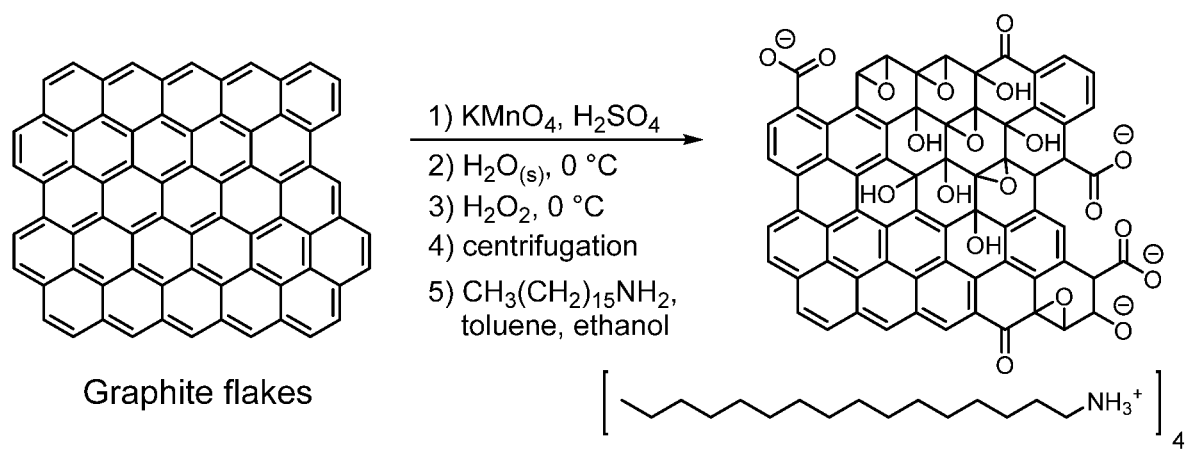
FIG. 2 illustrates the method of making a graphene oxide dispersion in toluene.
Figure 3:
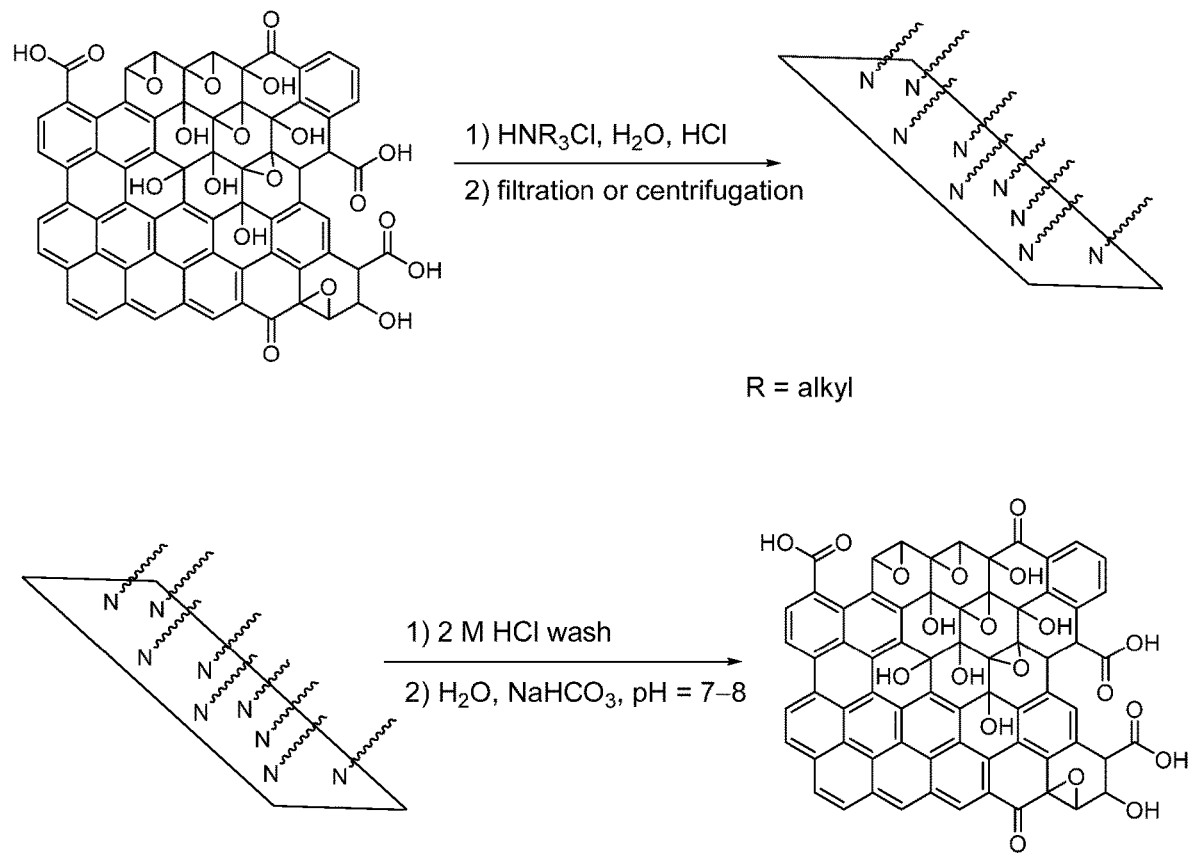
FIG. 3 illustrates the reversible formation of graphene oxide hydrogels according to the methods described herein.

Graphene oxide (GO) hydrogels are important for bulk processing, purification, shipping, and storage. These are concentrated, greater than 10 g/L, aqueous gels.

Provided herein are methods for forming graphene oxide gels. The graphene oxide gels prepared by the methods provided herein have fewer impurities than graphene oxide gels prepared by conventional methods. Advantageously, the graphene oxide gels prepared by the methods described herein are prepared in less corrosive conditions, allowing a broader range of applications than were previously available. The graphene oxide hydrogels can be used applications that require a controlled pH or non-corrosive conditions.

The hydrogels produced by the methods described herein can be further processed by lyophilization to give graphene oxide aerogels. Additionally, the graphene oxide aerogels can be thermally reduced to form graphene aerogels, the lowest density solid material known.

Without being limited by theory, it is believed that the graphene oxide gels produced by the methods described herein are formed from an electrostatic interaction of the graphene oxide surface with the ionic end of the ammonium or phosphonium salt. Advantageously, this can be used to reversibly change the polarity of the graphene oxide. Using the methods described herein, one can make graphene oxide hydrophobic when it is normally hydrophilic.

A further advantage of the methods described herein is that by using the reversal of the polarity of the graphene oxide it is possible to can make anhydrous graphene oxide dispersions in organic solvents.

The term gel, as used herein, refers to a jelly-like colloidal or flocculent material, held together by, e.g., cross-linking, intermolecular forces, electrostatic forces, etc. The graphene oxide hydrogels are gel compositions of graphene oxide in water or aqueous solution. The graphene oxide gels described herein can be isolated by such methods as filtration or centrifugation. The graphene oxide gels or graphene oxide hydrogels produced by the methods described herein are advantageously reversible. Also provided herein are graphene oxide aerogels, which are extremely low density solids, formed by the methods described herein.

The term reversible as applied to the formation of graphene oxide gels prepared by the methods described herein refer to the flocculation of graphene oxide to form a gel that can be isolated by filtration or centrifugation. Graphene oxide normally prepared by conventional methods cannot be separated in this way. Accordingly, the test for determining that graphene oxide is no longer a hydrogel is its inability to separate from the water by centrifugation at 4000 rpm and inability to isolate by vacuum filtration thus behaving like graphene oxide dispersions that have not been treated with ammonium or phosphonium salts.

The term alkyl, as used herein, includes $C_1$ to $C_{20}$ linear or branched alkyl radicals, examples include methyl, ethyl, propyl, isopropyl, butyl, tert-butyl, and so forth. Alkyls may be substituted at one or more positions with other functional groups, provided such substitution does not render the alkyl unusable in the methods described herein. Alkyl can further include cycloalkyl and heterocycloalkyl.

The term aryl, used alone or in combination with other terms such as alkylaryl, haloaryl, or haloalkylaryl, includes such aromatic radicals as phenyl, biphenyl, and benzyl, as well as fused aryl radicals such as naphthyl, anthryl, phenanthrenyl, fluorenyl, and indenyl and so forth. The term aryl also encompasses heteroaryls, which are aryls that have carbon and one or more heteroatoms, such as O, N, or S in the aromatic ring. Examples of heteroaryls include indolyl, pyrrolyl, and so on. Aryl further included substituted aryl groups, such as alkyl-substituted aryl groups and halide-substituted aryl groups. Alkyl substituted aryls include but are not limited to, for example, butylphenyl, propylphenyl, ethylphenyl, methylphenyl, 3,5-dimethylphenyl, tert-butylphenyl and so forth. Halide-substituted aryl or haloaryl, refers to aryl radicals in which one or more substitutable positions has been substituted with a halo radical, examples include fluorophenyl, 4-chlorophenyl, 2,5-chlorophenyl and so forth. Haloalkylaryl refers to aryl radicals that have a haloalkyl substituent. Examples of haloalkylaryls include such radicals as bromomethylphenyl, 4-bromobutylphenyl and so on.

The organic amines described herein may be primary, secondary, tertiary or quaternary amines. The organic amines described herein may include linear, branched or cyclic functional groups. The organic amines may be diamines, triamines, tetramines, or polyamines. In some preferred embodiments, the organic amines include a combination of 1-4 alkyl $C_1$ to $C_{30}$ alkyl chains, wherein the alkyl chains may be the same or different; in some embodiments, the organic amine may have 1-4 $C_1$-$C_{20}$ alkyl groups; in some embodiments, the a $C_{10}$-$C_{20}$ primary alkyl amine is preferred; in other embodiments, a secondary amine with one $C_{10}$-$C_{20}$ alkyl group and one methyl group is preferred; in other embodiments, tertiary amine with two $C_{10}$-$C_{20}$ alkyl groups and one methyl group is preferred; in still other embodiments, a quaternary amine with three $C_{10}$-$C_{20}$ alkyl groups and one methyl group is preferred. Other similar alkyl amines may be preferred in other applications. In some embodiments, the amines may be polymeric amines such as polylysine, polyethyleneimine, polyacrylamide, poly(allylamine) and so forth. The amines may also be cyclic amines, also referred to as heterocyclic amines. Cyclic amines include both aromatic cyclic amines and non-aromatic cyclic amines. Some non-limited examples of cyclic amines include: pyrrolidine, methylpyrrolidine, imidazole, methylpyridine, piperidine, piperizine, pyrimidine, quinolone, acridine, 1,8-diazabicyclo(5.4.0)undec-7-ene (DBU).

In certain embodiments, the amines may be hydrophobic or very hydrophobic. In other embodiments, the amines may be hydrophilic. In yet other embodiments, the amines may be amphipathic.

In accordance with some of the embodiments described herein, particularly preferred amines include: triethylamine, diisopropylethylamine, tetrabutylammonium hydroxide, 6-aminohexanoic acid, HEPES, N,N-dimethyldodecylamine, diisopropylamine, hexylamine, hexadecylamine, methyltrioctylammonium chloride, dodecyltrimethylammonium chloride, 4,4'-dipyridyl, tris(2-aminoethyl)amine, benzyltriphenylphosphonium chloride, methyltrioctylammonium chloride, dodecyltrimethylammonium chloride, 1,12-diaminododecane, tetrakis(4-aminophenyl)methane, and alkylamines having 1-4 $C_{10}$-$C_{30}$ alkyl groups and 0-1 methyl groups.

In some embodiments, a phosphonium salt is used instead of an amine. Particularly preferred are quaternary phosphonium salts. In one preferred embodiment, the phosphonium salt is benzyltriphenylphosphonium chloride.

The functional groups described herein may be substituted at one or more positions with other functional groups, provided such substitution does not render the alkyl unusable in the methods described herein. Suitable substituents would be known to those of ordinary skill in the art and may include functional groups such as alkenes, alkynes, halides, alcohols, ethers, aldehydes, ketones, carbonyls, carboxylic acids, esters, amino acids, amines, amides, imines, thiols, disulfides, aryls, heteroaryls and so forth.

The graphene oxide hydrogels are formed in an acidic aqueous solution. Inorganic acids are preferably used in the methods described herein. Exemplary inorganic acids useful in these methods include sulfuric acid, hydrochloric acid, nitric acid, phosphoric acid, and so forth. The acid concentration in the aqueous solution is preferably in the range from about 0.004 M to about 2 M. The pH is preferably in the range from about 6.5 to about 1, and more preferably in the range from about 6 to about 1.5. In still other embodiments, the pH is in the range from about 5 to about 2. In most embodiments it is preferred that the pH remain below 7 after the addition of organic amine or phosphonium salt.

Methods

Procedure for making the graphene oxide hydrogels. To a dispersion of graphene oxide in water that has a graphene oxide concentration of 1-5 g/L and a sulfuric acid concentration between 2 and 0.004 M, an amine or phosphonium salt is added with stirring. The amount of amine added is preferably at least enough to make a 0.004 M solution for amines containing shorter alkyl groups such as triethylamine. If the amine contains multiple amine functional groups on the same molecule or has very hydrophobic alkyl, aryl, or heterocyclic groups, the molecular concentration may be reduced such that the total amine content is not less than 0.9 (mmol amine)/(g graphene oxide). Alternatively, an aqueous solution of alkylammonium bisulfate can be added enough to make a solution that has a total concentration of ammonium salt equal to 0.004 M. Graphene oxide gels can be isolated by centrifugation or filtration.

Some non-limiting examples of organic amines, all available through Sigma-Aldrich, St. Louis, Missouri, include: primary, secondary, tertiary and quaternary alkylamines, wherein the alkyl groups may be the same or different, cyclic amines, such as piperidine and piperazine, cyclic aromatic amines, such as pyrrolidine, methylpyrrolidine, imidazole, methylpyridine, and so forth. In some exemplary organic amines for use in the methods described herein include triethylamine, diisopropylethylamine, tetrabutylammonium hydroxide, 6-aminohexanoic acid, HEPES, N,N-dimethyldodecylamine, diisopropylamine, hexylamine, hexadecylamine, 4,4'-dipyridyl; 4,4'-Trimethylenedipyridine; Tris(2-aminoethyl)amine, and piperidine.

In some embodiments, phosphonium salts may be used, quaternary phosphonium salts are especially preferred. A preferred phosphonium salt for use in the methods described herein is benzyltriphenylphosphonium chloride.

Procedure for making graphene oxide aerogels. A graphene oxide hydrogel as formed in the method above is frozen in a round bottom flask at −78 C in a dry ice bath. The flask is placed under vacuum at 9 mbar and allowed to warm to ambient temperature under active vacuum.

Procedure for making graphene aerogels. A graphene oxide aerogel is placed under vacuum and heated above 150° C. under active vacuum for 4 h.

Procedure for making graphene oxide dispersion in anhydrous solvent. This process is optimal for preparing graphene oxide dispersions in anhydrous solvents such as toluene, dichloromethane, anhydrous ethanol, and so forth. The reactant, i.e., the organic amine or phosphonium salt is hydrophobic, and most preferably highly hydrophobic. Some non-limiting examples of suitable reactants include $C_{10}$ to $C_{20}$ primary, secondary, tertiary and quaternary amines, and similar phosphonium salts. Some preferred amines include $C_{16}H_{33}NH_3Cl$, $C_{11}H_{23}N(CH_3)_2HCl$, and $(C_{10}H_{21})_3N(CH_3)Cl$. Depending on the final use of the prepared dispersion, the reagent is preferably chosen such that it is inert to specific reagents that may be used.

A four neck round bottom flask is then set up in a plastic tub, fit with an overhead stirrer, a nitrogen inlet, an addition funnel with a nitrogen outlet, and a thermometer, and then purged with nitrogen for 20 min. 4 L of 2 mg/mL graphene oxide dispersion of water (Aldrich catalog number 763705) is added to the flask. 0.75 L toluene and 0.75 L ethanol are then added to the reaction mixture.

An organic amine or phosphonium salt reactant is added in the molar ratio described above and dissolved into 0.75 L ethanol, and this mixture is added streamwise with very rapid stirring. A thick gel will form and will separate from the aqueous portion. The reaction mixture is allowed to stir for 30 min.

The solid material is isolated by centrifugation, e.g., 3500 rpm for 15 min should be adequate. The liquid supernate is decanted into a collection flask holding back any solids using a spatula. All solid material is collected in a large vessel. All clear liquid is collected in a waste container reserved for this reaction.

Ethanol is added to the solid mixture to a total volume of 4.0 L. The mixture is stirred well until all the material has dispersed, and a thick homogeneous product/ethanol mixture results. More ethanol may be added in order to get a homogeneous dispersion.

The solid material is isolated by centrifugation. The clear liquid supernate is decanted into a collection flask, and the solid material is collected into a large vessel. The supernate is added to the collected waste stream.

Ethanol is added to the solid material to a total volume of 4.0 L and stirred well until homogeneous, 30 minutes is typically sufficient for this step. The solid material is isolated by centrifugation. The clear liquid supernate is decanted into a collection flask. The solid material is placed into a large rotovap flask. The clear liquid ethanol mixture is added to the collected waste stream.

A preferred anhydrous solvent, for example toluene, dichloromethane, anhydrous ethanol or other, is added to the solid material to a total volume of 4 L and mixed until homogeneous. The volatiles are removed on the rotovap to a total volume of 1 L. This step is repeated twice. The product can be dried on the rotovap to dryness, then placed under high vacuum for 4 h.

Disperse this anhydrous hydrophobic solid graphene oxide into 4 L anhydrous solvent by stirring to obtain an anhydrous dispersion of graphene oxide.

Reversible flocculation of graphene oxide to form hydrogels by addition of alkylammonium salts. A solution of the ammonium hydrochloride salt is prepared by adding 1.8 mmol (NEt$_3$) or 1.0 mmol [N(Me$_2$)C$_{12}$H$_{25}$] into 5 mL 1 M HCl. The ammonium salt solution is added to a 40 mL graphene oxide dispersion that has a concentration of 3 g/L and a pH=6-1.5 such that the final pH is below 7. The graphene oxide hydrogel is isolated by vacuum filtration (polypropylene filter pad or Whatman® grade 1 filter paper) or centrifugation (3500 rpm for 10 min).

The gel is then transferred to a reaction vessel and 40 mL 2 M HCl is added then mixed well. The hydrogel is isolated by vacuum filtration or centrifugation as described above. These steps are repeated.

Water is added to the gel to a total volume of 40 mL and mixed well until homogeneous. A saturated sodium bicarbonate solution is added slowly with stirring until a homogenous dispersion is obtained or the pH is 8.

The flocculation of graphene oxide to form a gel that can be isolated by filtration or centrifugation is thus reversible according to this method.

Applications. The tunable nature of the graphene oxide gels and graphene oxide aerogels made by the methods described herein make them particularly well-suited to a number of applications. Specifically, by choosing a reactant, that is the organic amine or phosphonium salt, with specific properties, such as hydrophobicity, redox activity, compatibility with a system of interest, one can effectively, and reversibly, change the properties of the resulting graphene oxide gel, graphene oxide aerogel, or graphene aerogel produced.

Energy Storage. Supercapacitors are energy storage devices similar to batteries. Each includes two electrodes—an anode and a cathode, an electrolyte, and a separator between the anode and cathode. While batteries utilize an electrochemical reaction to provide electrical power to a device, supercapacitors store energy using an electrostatic buildup of charge in the anode and cathode. Supercapacitors currently have a lower energy density than batteries but the charge and discharge rates are higher. One important factor that affects energy storage capacity of a supercapacitor is the surface area of the electrode material. Activated carbon, reduced graphene oxide, and reduced graphene oxide aerogels, because of their high surface areas have all been used previously as anode and cathode materials in capacitors, with some success.

The graphene oxide hydrogels described herein, made using ammonium and phosphonium salts, can be used to make reduced graphene oxide aerogels by lyophilization followed by thermal reduction as described earlier. Advantageously, this procedure to make reduced graphene oxide aerogels gives the unique ability to engineer reduced graphene oxide aerogels using ammonium and phosphonium salts of different sizes and polarity to affect the surface area and energy storage capacity of the supercapacitors.

In choosing the reactant, i.e., the organic amine or phosphonium salt, it is first considered that supercapacitors will benefit from a reactant that can prevent stacking thereby increasing the surface area. Particularly suitable reagents include very hydrophobic or polymeric amines. Some examples of particularly suitable amines include spiro tetramines, 1,12-diaminododecane, and tetrakis(4-aminophenyl)methane. A second consideration, to increase capacity, redox active amines, such as polyaniline, may be used. In some embodiments, a combination of two or more amines may be used together to improve multiple properties.

Provided is a supercapacitor, including an anode and a cathode, an electrolyte ionically connecting the anode and the cathode; and an ion-permeable separator physically separating the anode and the cathode, wherein at least one of the anode and the cathode includes a graphene aerogel prepared by the method described herein. In a particularly preferred embodiment, both the anode and the cathode include a graphene aerogel produced by the method described herein.

The supercapacitor is suited for both aqueous electrolytes and organic electrolytes. Some exemplary aqueous electrolytes include inorganic acids, bases and salts, including but not limited to acids such as sulfuric acid, potassium hydroxide, quaternary phosphonium salts, sodium perchlorate, lithium perchlorate and lithium hexafluoride arsenate among others. Some exemplary organic electrolytes include, but are not limited to acetonitrile, propylene carbonate, tetrahydrofuran, diethyl carbonate, γ-butyrolactone and solutions with quaternary ammonium salts or alkyl ammonium salts such as tetraethylammonium tetrafluoroborate and (triethyl (metyl) tetrafluoroborate (NMe(Et)

The ion-permeable separator is an electrically insulating material; some non-limiting examples of separators include capacitor paper, cellulose paper, nonwoven porous polymers, woven glass fibers and porous woven ceramic fibers. In certain preferred embodiments, the ion-permeable separator is a nonwoven porous polymer selected from polyamide, polypropylene, polyethylene, poly (tetrafluoroethylene), polyvinyl chloride, and combinations thereof. In certain embodiments, the electrolyte and the separator are a single material selected from solid electrolytes and gel electrolytes.

More generally, electrodes having a conductive substrate and a graphene oxide aerogel or a graphene aerogel made by the methods described herein are useful for many applications. The high surface area, improved purity, and tunable properties make the aerogels described herein ideal for many applications.

Batteries: Similar to supercapacitors, for battery applications the amine is chosen to prevent restacking and make room for expansion when charged and filled with lithium. Exemplary amines for preparing graphene oxide hydrogels, and ultimately graphene aerogels in accordance with methods provided herein for use in battery applications include those listed above as useful in supercapacitors. Particularly preferred amines include 1,12-diaminododecane and tetrakis (4-aminophenyl)methane.

Air sensitive reactions: As discussed in the methods above and shown in the examples below, the methods described herein can advantageously provide graphene oxide hydrogels and aerogels and graphene aerogels, and graphene oxide dispersions in anhydrous solvents. Whereas the hydrophilic properties of graphene oxide have made its use in air sensitive applications very challenging, the flexibility of the methods described herein provide an effective route to materials tailored for such uses. Preferred amines for these applications include highly hydrophobic quaternary or tertiary ammonium salts that are inert to a variety of highly reactive reagents and help to disperse the GO into organic solvents. Some particularly preferred amines include N,N-dimethyldodecanamine, methyltrioctylammonium chloride, and dodecyltrimethylammonium chloride, though others can be determined by those skilled in the art.

The anhydrous graphene oxide dispersions are particularly well-suited for use in reactions involving, for example, organolithiums, Grignard reagents, acyl chlorides and others. Many other applications that necessitate utilizing graphene oxide in anhydrous conditions are also enabled by using the methods provided herein.

Hydrophobic composites. A further application available using the graphene oxide gels provided herein are preparation of hydrophobic composite materials. The composite material may be made using an anhydrous dispersion of graphene oxide prepared by the methods described herein by tuning the properties of the anhydrous graphene oxide dispersion by choosing a reactant, i.e., organic amine or phosphonium salt that has properties compatible with the other material in the composite to be formed. Long chain amines are suitable for the formation of many composite materials.

In one embodiment, a quantum dot containing composite may be made using an anhydrous graphene oxide dispersion formed using a longer alkyl primary amine such as 1-decanamine or larger. Such an anhydrous graphene oxide dispersion would also be compatible with other nanoparticles as well. In another embodiment, the anhydrous graphene oxide dispersions are combined with hydrophobic polymers to form composite materials.

Inks. The graphene oxide dispersions prepared by the methods described herein may also be used in the preparation of inks for coating or printing methods, including but not limited to spin coating, dip coating, blade coating, ink jet printing, silk screening, gravure printing and so forth. In these embodiments, the graphene oxide ink is formulated with an amine modified graphene oxide, a non-aqueous solvent, and additives. Using the methods described herein, the amine used with the graphene oxide can be chosen to give specific properties.

In one embodiment, the graphene oxide gel is prepared wherein the reactant is chosen from amines that have organic groups that match the polarity of the solvent used for the ink formulation. In a preferred embodiment, N,N-dimethyldodecanamine is used.

Purification. Another advantage of the methods described herein is that they yield graphene oxide gels with fewer adventitious impurities over those formed using conventional methods. Additionally, it has been found that these methods, specifically the gelling effect of the amine or phosphoium salt reactants can be employed to provide improved methods for purify graphene oxide. For purification applications, preferred reactants including organic amines that are water soluble in acidic or neutral water and contain at least one very hydrophobic group or multiple amine functional groups. Some preferred amines include, but are not limited to, N,N-dimethyldodecanamine, tris(2-aminoethyl)amine and tris [2-(dimethylamino)ethyl]amine.

In one embodiment, the purification methods includes the steps of dispersing the graphene oxide to be purified in an aqueous solution having a pH in the range from 6 to 1.5; adding a reactant, i.e., an organic amine or phosphonium salts, preferably, having very hydrophobic group or multiple amine functional groups; stirring the mixture to form a graphene oxide hydrogel; isolating the graphene oxide gel by filtration or centrifugation; washing the gel with water which may be neutral or acidic, pH 7-1, until the excess amine or phosphonium salt has been removed, yielding the purified graphene oxide gel, which is ready for storage, use, or further processing.

In some embodiments, the pH of the purified graphene oxide can be acidified with a volatile acid such as hydrochloric acid or acetic acid, or it may remain in neutral pH water. In other embodiments, the volatiles may be removed to dryness and the purified graphene oxide redispersed into neutral water. In still other embodiments, the pH of the purified graphene oxide may be adjusted with a base such as ammonia, hydroxide, or carboxylate, among others.

Because a number of different properties, i.e., tunable graphene oxide hydrogels, aerogels, and graphene aerogels can be achieved using the methods disclosed herein by changing the amine or phosphonium salt used, kits containing suitable components, including a graphene starting material, an suitable acid, and one or more suitable reactants can be envisioned to enable others to easily use the described methods.

Examples. The following method was used to prepare a number of graphene oxide hydrogels with various amines.

Formation of graphene oxide hydrogels. To a dispersion of graphene oxide in water that has a graphene oxide concentration in the range from 1-5 g/L and a sulfuric acid concentration between 2 and 0.004 M, an amine was added with stirring. The amount of amine added was at least enough to make a 0.04 M solution (on an amine basis). Graphene oxide gels were isolated by centrifugation at 4000 rpm for 10 min. The graphene oxide gels were then analyzed or processed further as outlined below.

A number of amines, all from Sigma-Aldrich (St. Louis, Missouri) were tested, including the following, each listed with the Sigma-Aldrich product number: triethylamine (T0886), diisopropylethylamine (387649), tetrabutylammonium hydroxide (178780), 6-aminohexanoic acid (07260), HEPES (H3784), N,N-dimethyldodecylamine (284386), diisopropylamine (471224), hexylamine (219703), hexadecylamine (445312), 4,4'-dipyridyl (289426); 4,4'-Trimethylenedipyridine (121193); Tris(2-aminoethyl)amine (225630). Each of these amines resulted in a graphene oxide hydrogel, and the properties of each varied with the properties of the particular amine used.

This showed that the method provided herein is useful for forming graphene oxide hydrogels using a wide range of organic amines as reactants. Further, this shows the methods provide an efficient way to tune the properties of graphene oxide gels for varying applications because the method does work over a wide range of amines with different properties.

Comparative Example. The process for forming a graphene oxide aerogel outlined above was carried out using ammonia as the amine reactant. No graphene oxide gel was formed.

Formation of graphene oxide aerogels. A graphene oxide hydrogel as formed above was frozen in a round bottom flask at −78 C in a dry ice bath. The flask was placed under vacuum at 9 mbar and allowed to warm to ambient temperature under active vacuum to provide the graphene oxide aerogel.

Graphene oxide aerogels prepared by the method above may be converted to graphene aerogels as follows. A graphene oxide aerogel is added to a flask and placed under vacuum. The flask is heated at 200° C. under active vacuum for 4 h.

Graphene oxide dispersion in toluene. A four-neck round bottom flask was fitted with an overhead stirrer, a nitrogen inlet, a nitrogen outlet, and a thermometer and purged with nitrogen; all additions were done through a funnel over a flow of nitrogen. Sulfuric acid (290 mL) was added to the flask. Graphite (Aldrich, 7.0 g) was added over a flow of nitrogen with slow stirring. The reaction mixture was cooled with a water bath that had been cooled to 10-15° C. Potassium permanganate (12.5 g) was added to the reaction mixture with slow stirring, then the funnel was replaced with a stopper. Nitrogen was passed through a pressure equalizing bubbler. The temperature kept at or below 30° C. and the reaction mixture was allowed to stir for 1 h. Potassium permanganate (12.5 g) was added to the reaction mixture through the funnel over a flow of nitrogen with slow stirring. The funnel was replaced with a Teflon lined glass stopper and the reaction mixture was allowed to stir slowly at ambient temperature for 4 days. Ice and water were added to a quench vessel then the reaction mixture was added and stirred to quench the reaction. The quench mixture was diluted with water to a total volume of 3.0 L. 30% hydrogen peroxide solution in water (23 mL) was added to the quench vessel and bubbling was observed. The mixture was slowly stirred until purple color dissipated and a yellow suspension was left.

The solid material was isolated by centrifugation. The solid product was transferred to a large vessel and approximately 4 L water was added to make a total volume of 4.50 L. The mixture was stirred well a homogeneous brown/orange dispersion was obtained. Any remaining larger heavy solid material was removed by centrifugation. The liquid supernate portion was carefully decanted into a four neck round bottom flask that had been fit with an overhead stirrer, a nitrogen inlet, an addition funnel with a nitrogen outlet, and a thermometer and then purged with nitrogen. Toluene (0.75 L) and ethanol (0.75 L) were added to the reaction mixture. Hexadecylamine (12.0 g) was added into ethanol (0.75 L) and this mixture was added to the addition funnel streamwise with rapid stirring. A thick paste that separated from the aqueous portion was formed. The reaction was allowed to stir for 30 minutes, and then the solid material was isolated by centrifugation.

The liquid was decanted and all solid material was collected in a large vessel. Ethanol was then added to the solid mixture to a total volume of 4 L. This was stirred until the material has dispersed, yielding a thick homogeneous product/ethanol mixture. The solid was isolated by centrifugation and the solid was collected in a large vessel. Ethanol was added again to a total volume of 4 L. The mixture was stirred again until homogenous and the solid material isolated by centrifugation.

The solid material was transferred to a large rotovap flask and toluene was added to a total volume of 4 L. The volatiles were removed on the rotovap to a total volume of about 1.5 L being careful to not dry the material completely. The rotovap procedure was repeated twice, and then the product was diluted with anhydrous toluene to the desired concentration. The graphene oxide aerogel in anhydrous solution can be processed further as shown below or used as is in applications requiring anhydrous conditions.

Preparation of carboxylic acid functionalized graphene oxide from the toluene dispersion. A dispersion of graphene oxide (0.16 g) in toluene (40 mL) was prepared as above replacing the primary amine hexadecylamine with a non-nucleophilic tertiary amine N,N-dimethyldodecylamine. The toluene was removed to dryness and allowed to remain under vacuum for 3 h. the resulting solid was dissolved into dichloromethane (50 mL). Adipoyl chloride (0.56 mL) was added by syringe through a septum with stirring under nitrogen. Pyridine (0.63 mL) was added dropwise by syringe through a septum with stirring under nitrogen. The reaction mixture was allowed to stir overnight for 16 hours at ambient temperature. Water (80 mL) was added to the reaction mixture and mixed well. The resulting solid was isolated by centrifugation at 4000 rpm for 10 min. The two layers of solvent were decanted away from the solid, which appeared between the two layers. The resulting solid was washed with aqueous acetic acid (1.5 g acetic acid in 150 mL water) isolating the solid again by centrifugation. The solid was washed with acetic acid in ethanol (1.0 g acetic acid in 150 mL ethanol) and the solid was isolated by centrifugation. The solid was washed again with ethanol (150 mL) isolating the solid by centrifugation. The resulting solid paste was dried under high vacuum for analysis.

The examples described herein are for illustrative purposes only and are not meant to limit the scope of the claims.

The invention claimed is:

1. A method of forming a graphene oxide gel comprising the steps:
    providing an aqueous dispersion of graphene oxide, wherein the aqueous dispersion further comprises an inorganic acid, and the aqueous dispersion is acidic;
    adding a reactant selected from the group consisting of organic amines, quaternary ammonium salts and phosphonium salts,
    wherein the organic amine is selected from the group consisting of alkyl amines, heterocyclic amines, polymeric amines, spiro tetramines and combinations thereof;
    wherein the aqueous dispersion of graphene oxide has a graphene oxide concentration in the range from about 0.1 g/L to about 5 g/L and the reactant has a total organic amine concentration or total phosphonium salt concentration in the range from about 10 mM to about 70 mM, and
    stirring the mixture to form the graphene oxide hydrogel.

2. The method of claim 1 wherein the reactant is an organic amine or quaternary ammonium salt, and the organic amine or quaternary ammonium salt is selected from the group consisting of primary organic amines, secondary organic amines, tertiary organic amines, quaternary ammonium salts, and combinations thereof.

3. The method of claim 2 wherein the reactant is selected from the group consisting of triethylamine, diisopropylethylamine, tetrabutylammonium hydroxide, 6-aminohexanoic acid, HEPES, N,N-dimethyldodecylamine, diisopropylamine, hexylamine, hexadecylamine, 4,4'-dipyridyl, tris(2-aminoethyl)amine, benzyltriphenylphosphonium chloride, methyltrioctylammonium chloride, dodecyltrimethylammonium chloride, 1,12-diaminododecane, tetrakis(4-aminophenyl)methane, and combinations thereof.

4. The method of claim 1 further comprising the step of isolating the resulting graphene oxide hydrogel.

5. The method of claim 4 wherein the graphene oxide hydrogel is isolated by filtering.

6. The method of claim 4 wherein the graphene oxide hydrogel is isolated by centrifugation.

7. The method of claim 1 wherein the ratio of the reactant to graphene oxide is from about 0.9 mmol reactant per gram graphene oxide to about 400 mmol reactant per gram graphene oxide.

8. The method of claim 1 wherein the total organic amine concentration or total phosphonium salt concentration is about 40 mM.

9. The method of claim 1 wherein the concentration of the inorganic acid is in the range from about 0.004 to about 2 M.

10. The method of claim 1 wherein the inorganic acid is selected from the group consisting of sulfuric acid and hydrochloric acid.

11. The method of claim 4 further comprising the step of lyophilizing the graphene oxide to form a graphene oxide aerogel.

12. The method of claim 11 further comprising the step of reducing the graphene oxide aerogel to form a graphene aerogel.

13. The method of claim 12 wherein the reducing step comprises thermal reduction.

14. The method of claim 12 wherein the reducing step comprises chemical reduction.

15. A method of forming a graphene oxide gel comprising the steps:
providing an aqueous dispersion of graphene oxide, wherein the aqueous dispersion is acidic;
adding a reactant selected from the group consisting of organic amines and phosphonium salts,
wherein the organic amine is selected from the group consisting of alkyl amines, arylamines, heterocyclic amines, polymeric amines, spiro tetramines and combinations thereof;
wherein the ratio of the reactant to graphene oxide is from about 0.9 mmol reactant per gram graphene oxide to about 400 mmol reactant per gram graphene oxide;
wherein the total organic amine concentration or total phosphonium salt concentration is in the range from about 10 mM to about 70 mM; and
stirring the mixture to form the graphene oxide hydrogel.

16. A method of forming a graphene oxide gel comprising the steps:
providing an aqueous dispersion of graphene oxide, wherein the aqueous dispersion is acidic;
adding a reactant selected from the group consisting of organic amines and phosphonium salts,
wherein the aqueous dispersion of graphene oxide has a graphene oxide concentration in the range from about 0.1 g/L to about 5 g/L and the reactant has a total organic amine concentration or total phosphonium salt concentration is about 40 mM; and
stirring the mixture to form the graphene oxide hydrogel.

* * * * *